United States Patent [19]

Krafft

[11] 4,147,155
[45] Apr. 3, 1979

[54] DEVICE FOR COLLECTING SOLAR ENERGY

[76] Inventor: Frederick G. Krafft, 2975 Fox Hollow Rd., Springfield, Ohio 45502

[21] Appl. No.: 760,764

[22] Filed: Jan. 19, 1977

[51] Int. Cl.² ............................................. F24J 3/02
[52] U.S. Cl. ............................... 126/271; 126/270; 237/1 A
[58] Field of Search .............. 126/270, 271; 237/1 A; 165/168, 169, 172, 173

[56] References Cited

U.S. PATENT DOCUMENTS

| | | | |
|---|---|---|---|
| 3,239,000 | 3/1976 | Meacher | 126/271 |
| 3,918,430 | 11/1975 | Stout et al. | 126/271 |
| 3,968,652 | 7/1976 | Chevalier | 126/271 X |
| 3,981,294 | 9/1976 | Deminet et al. | 126/271 |
| 3,990,431 | 11/1976 | Mazzoni et al. | 126/271 |
| 4,010,614 | 3/1977 | Arthur | 126/271 |
| 4,019,496 | 4/1977 | Cummings | 126/271 |
| 4,031,881 | 6/1977 | Thiel | 126/271 |
| 4,062,351 | 12/1977 | Hastwell | 126/271 |
| 4,062,352 | 12/1977 | Lesk | 126/271 |

FOREIGN PATENT DOCUMENTS 2304875  10/1976  France ..................................... 126/271

Primary Examiner—William F. O'Dea
Assistant Examiner—Larry Jones
Attorney, Agent, or Firm—Albert L. Jeffers

[57] ABSTRACT

A device for collecting solar heat energy in which a transparent glass or plastic member, preferably extruded, is provided with the body having upper and lower and peripheral walls with integral passages extending therethrough parallel and spaced from the top and bottom walls and through which fluid is passed. On opposite sides of the passages, dead gas spaces are formed in the body of the glass or plastic material for insulating purposes. The collector according to the present invention can be mounted in a frame and tilted by an automatic device so as always to present the device in a plane substantially normal to the direction of solar radiation.

4 Claims, 8 Drawing Figures

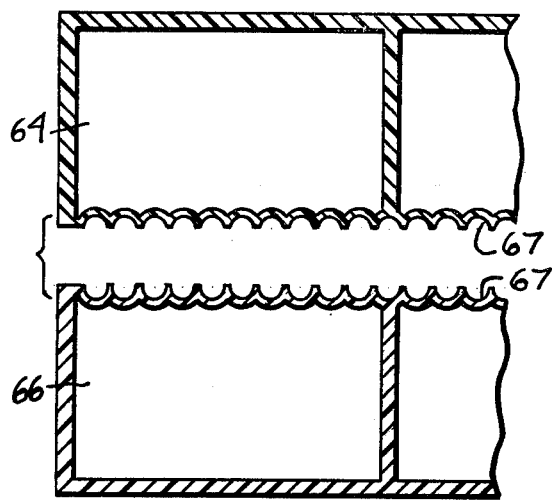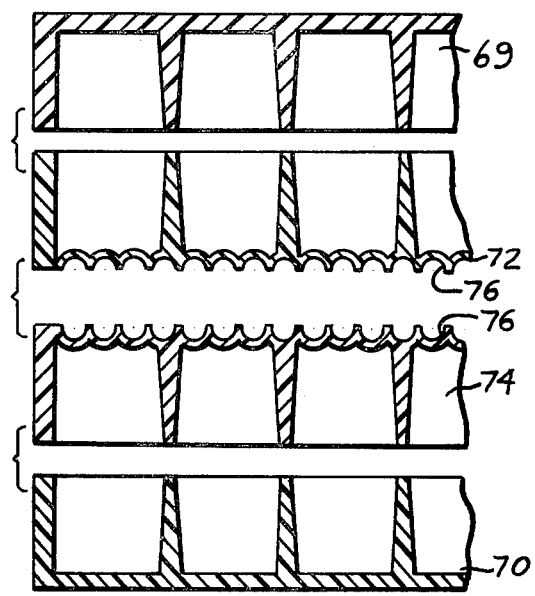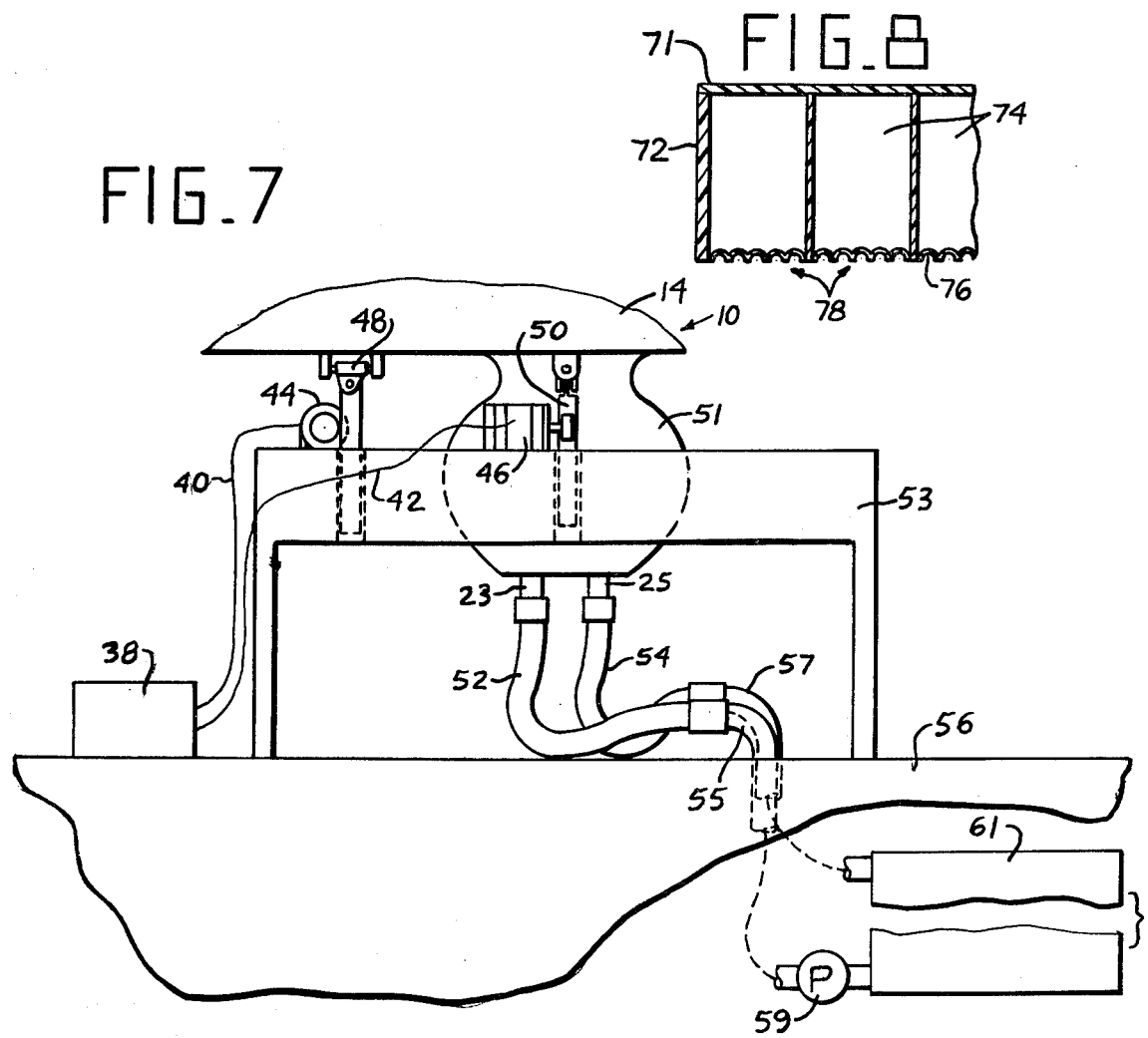

DEVICE FOR COLLECTING SOLAR ENERGY

The present invention relates to a device for the collection of solar heat energy, and is particularly concerned with improvements in effeciency in solar heat collection devices and in the method of making such devices and in constructing and utilizing such devices.

Devices for collecting solar heat energy have been known and experimented with for a long time. Heretofore, the devices have been relatively expensive to construct and have proved to be relatively inefficient and, in general, have not been satisfactory.

With the foregoing in mind, the present invention proposes the construction of a device for collecting solar energy in which the drawbacks referred to above are eliminated.

BRIEF SUMMARY OF THE INVENTION

The solar heat energy collector of the present invention comprises one or more units with each unit comprising a body of material which is formed of a translucent or transparent plastic which may, for example, be an acrylic resin. It is also possible to use glass. Other materials will suggest themselves, with the material, in every case, being relatively transparent to solar radiation and capable of prolonged exposure to the elements without significant deterioration.

The body of material forming a single unit includes a top wall, a bottom wall and a peripheral wall and extending therebetween a central web parallel to the top and bottom walls and including therein a plurality of side by side fluid passages. Manifolds at each end of the unit communicate with the passages to form the means for causing fluid flow into and out of the passages with the fluid collecting solar heat energy from sunlight passing through the top wall of the unit, and through the fluid confining wall directly into the fluid. Efficiency of the device derives from heating the fluid directly without heating the collecting device.

Each unit is preferably mounted in a frame which confines the unit from beneath and laterally while exposing the top wall thereof while being formed of a material which either conducts heat poorly or which is insulated against heat flow outwardly from the unit.

Each frame may be tiltably supported so that the unit therein can be presented with the top wall in a frame substantially perpendicular to the sunlight falling thereon, or may be conventionally supported.

It is advantageous for the unit to be formed by an extrusion process with the ends of the unit being closed after the extrusion has been made. An extrusion of the nature referred to might, for example, be three to about six feet in width and can be formed in suitable lengths.

When the collector is in operation, light sensitive detectors carried by the frame cause automatic tilting of the frame so that the collector will follow the sun as the earth rotates while fluid is caused to flow through the passages in the unit, either by pumping means or by convection. The heated fluid withdrawn from the collector can be stored or delivered to points of use.

As many collectors as might be desired can, of course, be included within a single system. Instead of sensing the movement of the earth by light sensitive detection to cause the frame to tilt to follow the sun, the movement of the frame could be under the control of a clockwork, either mechanical, electrical or electronic, or could otherwise be programmed to follow the sun and then return to a starting position. The motor driving the frame could, for example, be powered by a battery that is charged by a solar cell.

While it is advantageous for the plastic material to be transparent to the heat radiating from the sun, it is advantageous to provide reflecting means on the rearward side of the fluid conducting passages which may be, for example, an aluminized electroplated surface, or a reflecting foil, and it is also of advantage to include a pigment or dye in the fluid passing through the passages in order to enhance the ability of the fluid to convert the solar energy to heat energy, or to coat the inner walls of the fluid passages with a pigment or dye or other opaque substance to convert the solar energy into heat energy and conduct the heat energy into the fluid.

Advantageously, the unit is mounted on a swivel support so as to be freely tiltable in all directions and the fluid supply and fluid withdrawal lines or conduits are connected with the unit through the tiltable support with the connections including flexible hoses so that the unit is freely tiltable under all conditions.

The exact nature of the present invention will become more clearly apparent upon reference to the following detailed specification taken in connection with the accompanying drawings in which:

FIG. 5 is a fragmentary sectional view drawn at enlarged scale and showing a modification.

FIG. 6 is a fragmentary sectional view, drawn at enlarged scale, and showing a modification.

FIG. 7 is a somewhat schematic fragmentary view showing an arrangement for the swivel mounting of a collector unit according to the present invention.

FIG. 8 shows a modification.

DETAILED DESCRIPTION OF THE INVENTION

Figure 1:
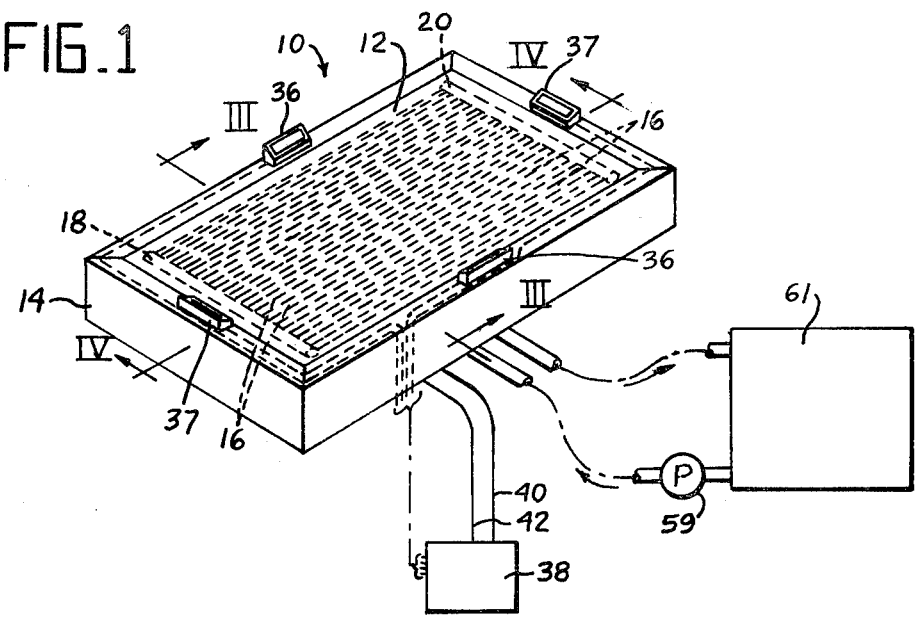
FIG. 1 is a somewhat schematic perspective view showing a solar heat collector according to the present invention.

Referring to the drawings somewhat more in detail, the drawings show a single collector unit, although it will be understood that, as mentioned, a plurality of units could be connected together for supplying heated fluid to a single system.

Figure 2:
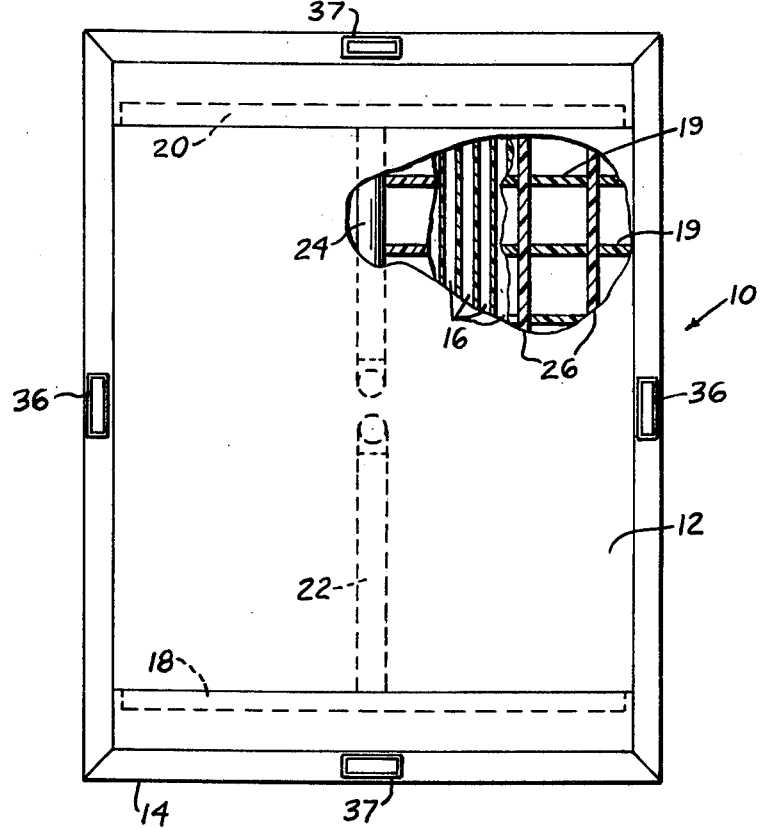
FIG. 2 is a somewhat schematic plan view looking down on top of a collector according to the present invention.

As will be seen in FIGS. 1 and 2, the collector unit, generally indicated at 10, comprises a body of material, preferably plastic and translucent and transparent, at least in respect of the heat radiated by the sun. The body of material may be self-supporting, or it may be mounted in a support frame 14 which confines the body on the sides thereof and at the bottom while leaving the upper wall or web 11 thereof exposed. Web 11 thus has the upper surface 12 disposed for the passage of heat radiation from the sun therethrough.

The body of the collector is provided with side by side passage means 16 in about the middle of the height thereof extending in a direction substantially parallel to the top and bottom walls of the unit. The passages 16, at the opposite ends thereof, communicate with manifolds 18 and 20 extending transversely to the passages 16 and provide for the purpose of admitting fluid thereto and withdrawing fluid therefrom. Passages 18 and 20 communicate with longitudinally extending conduits 22 and 24 on the underneath side of passages 16 and which passages 22 and 24 include connection portions 23 and 25 which extend out the bottom of the unit through the bottom of frame 14 in a direction substantially perpendicular to the top and bottom walls of the unit.

Figure 3:
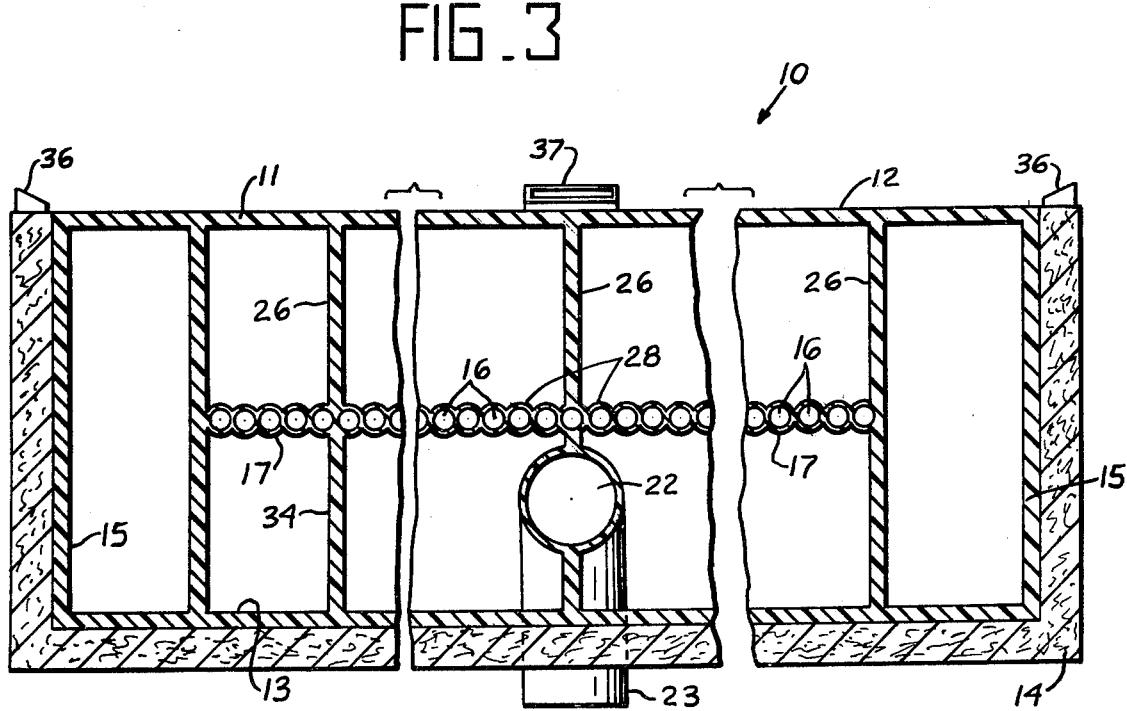
FIG. 3 is a transverse section indicated by line III—III on FIG. 1, drawn at enlarged scale, and partly broken away.
Figure 4:
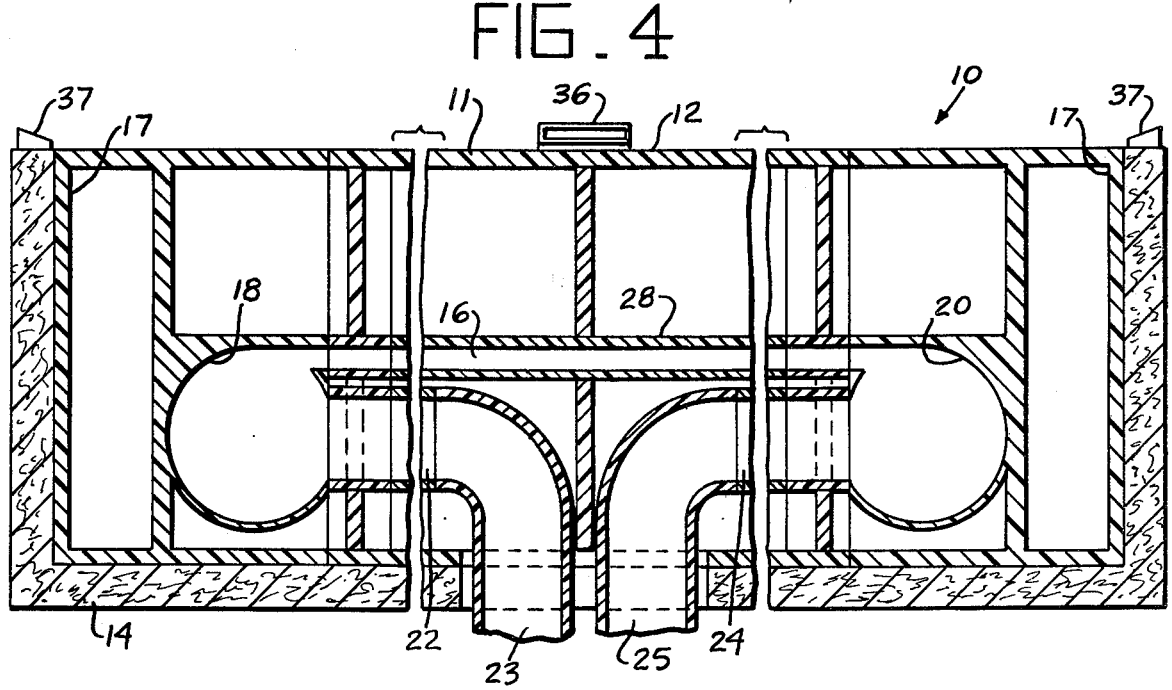
FIG. 4 is a longitudinal section indicated by line IV—IV on FIG. 1, drawn at enlarged scale, and partly broken away.

As will be seen in FIGS. 3 and 4, the tubular passages 16 are formed in a central web 28 formed in the body of the collector unit and extending from side to side thereof. Advantageously, the side to side direction of the collector unit is the shorter direction and the dimension of the unit in the direction of the axes of passages 16 is the longer dimension.

As will also be seen in FIGS. 2 and 3, the unit includes longitudinal ribs 26 between web 28 and top wall 11 and longitudinal ribs 34 between the bottom of web 28 and the bottom wall 13 of the unit. FIG. 2 will also show that transversely extending stiffening elements 19 could also be supplied extending at right angles to longitudinal ribs 26 while similar stiffening elements could be provided beneath transverse web 28 and extending between ribs 34.

The body of the unit, including top wall 11, bottom wall 13, side walls 15 and web 28, with passages 16, and longitudinal reiforcing ribs 26 and 34, can be extruded and cut off to any desired length. The longitudinal passages 22 and 24, which communicate with manifolds 18 and 20, can be coincidently extruded and thereafter interrupted in the center of the unit so that the connecting portions 23 and 25 can be connected thereto as by cementing or fusing.

Similarly, each unit, as will be seen in FIG. 4, has end walls 17, and these must be supplied to the unit after it has been extruded and cut off. Further, the transverse manifolds 18 and 20 cannot be extruded together with the unit so that these elements are mounted in the unit and connected with the longitudinal passages 22 and 24 and with the opposite ends of the passages 16 following the extrusion of the unit. After manifolds 18 and 20 are put in place, end walls 17 can be cemented or fused on the ends of the unit and a complete basic structure is then provided adapted for being placed in the respective support frame 14.

The longitudinal ribs 26 and 34, together with any lateral reinforcing elements 19 extending therebetween divide the space inside the unit above and below web 28 into dead spaces which inhibit loss of heat from the fluid in passages 16. Thus, if fluid is caused to flow through passages 16, either by convection or by a pump arrangement, while sunlight is passing through upper web 11, and the heat therefrom being collected by the fluid in passages 16, relatively efficient conditions will be created with a minimum loss of heat from each unit by radiation or conduction.

It has been mentioned that the fluid passing through the unit or the inside surfaces of passages 16 can be dyed or pigmented to increase the absorption of heat thereby, and it is also possible to provide the rearward side of web 28 with light reflecting surfaces, as at 21, especially in respect of modifications to be discussed hereinafter.

As will be seen in FIG. 7, the bottom of frame 14 may be provided in about the geometric center thereof with a ball element 51 protruding therefrom which is swivelly receivable in a socket member 53 which is mounted on the support member 56 on which the collector is mounted. It will be noted that connectors 23 and 25 extend completely through ball 51 and are connected by flexible conduits 52 and 54 with main conduits 55 and 57 which lead to storage or points of distribution of the heated liquid.

Conduit 55 is the one which is connected with supply conduit 22 and supply manifold 18 and to this end may have a pump 59 therein for pumping liquid from a place of storage 61 and to which place of storage the heated liquid is returned via conduit 57.

In the FIG. 5 modification, the unit can be made up of an upper portion 64 and a lower portion 66 which are molded separately and which are then cemented together in face to face relation so that the semi-circular grooves 67 therein will make up the longitudinal passages for fluid flow. The elements 64 and 66 may, in fact, be identical with the manifolds 16 and 18 and conduits 22 and 24 previously referred to being incorporated in whichever one of the elements 64, 66 is to form the lower part of the unit after assembly.

It will be apparent that with the arrangement of FIG. 5, the semi-circular grooves 67 in that part of the unit which is to form the lower half thereof can be plated or otherwise provided with reflective surfaces as mentioned above in order to increase the efficiency with which fluid flowing in the longitudinal channels absorbs heat energy. Such reflective material can be placed on the inside of the grooves, if so desired.

In FIG. 6, the unit is again made up of molded parts with an uppermost part 69 and a lowermost part 70 which may be identical with each other. Similarly, the intermediate parts 72 and 74 may be identical with whichever thereof is to form the lower part being provided with manifolds and reflective surfaces on the grooves 76 formed therein if so desired. In the case of each of the modifications of FIGS. 5 and 6, the several parts are cemented or fused together with end wall portions being added to complete the assembly and with transverse support members also being provided extending between the longitudinal support ribs if so desired.

In the FIG. 8 modification is shown a multiply lamination of flat and embossed sheets processed to form the main body of a solar heat collecting device and including an outer skin 71 on the top and 72 at the side, closed cell insulating voids 74 formed beneath skin 71 and between support ribs 75, and fluid passages, one-half of which are formed as shown at 76 in each of the embossed laminations 78. A pair of the units of FIG. 8 can be combined as shown in FIGS. 5 and 6 to make up a collector unit.

It has been mentioned that the unit is arranged always to face directly toward the sun, and for accomplishing this, the upper edges of housing 14 are provided with photosensitive elements 36 on the lateral sides at the top edge and 37 at the ends on the top edge. The photosensitive elements are interconnected in a controller 38 which may, for example, include bridge circuits which detect differences in illumination of the light sensitive elements of the two pairs thereof.

The signals thus developed by the bridge circuits are supplied via electrical connectors 40 and 42 to electric motors 44 and 46 which are connected by elements 48 and 50 to frame 14 at points spaced laterally and longitudinally, respectively, from the central axis of ball 51 so that the unit is continuously activated to face squarely toward the sun.

It will be understood that, when a balanced condition is obtained, the signal supplied to the motor is reduced to zero and movement of the position of the unit ceases.

As an alternate, a clockwork mechanism can be provided to cause the unit to approximately follow the sun, or the unit can be conventionally mounted in the best average rigid orientation in relation to the sun.

Modifications may be made within the scope of the appended claims.

What is claimed is:

1. In an energy collector for collecting solar energy; a hollow body formed of a material which is substantially transparent to solar heat radiation, said body having a top wall, a bottom wall in spaced, parallel relation to said top wall, and a peripheral wall extending between said top and bottom walls, a web in said body disposed between said top and bottom walls in substantially equally spaced relation thereto and connected to said peripheral wall, said web having side by side passages formed therein in the plane thereof, reinforcing ribs parallel with said passages extending between said web and each of said top and bottom walls of said body, said ribs defining insulating spaces in said body on opposite sides of said web, at least said web with said passages therein and said ribs comprising an integral extruded element, and manifolds connected respectively to opposite ends of said passages for supplying fluid thereto and withdrawing fluid therefrom.

2. An energy collector according to claim 1 which includes other passage means between said web and said bottom wall for respectively supplying a fluid having heat absorbing properties to one of said manifolds and removing said fluid from the other manifold.

3. An energy collector according to claim 1 which includes reflective material on the exterior sides of said passages which face said bottom wall of said body.

4. An energy collector according to claim 1 in which said integral element includes axially aligned longitudinal passages formed in a said rib on the side of the web facing said bottom wall, said last-named passages having first remote ends respectively connected to said manifolds and second adjacent ends adapted for connection to supply and withdrawal conduits, respectively.

* * * * *